/<

Cal 4

United States Patent Office 3,207,764
Patented Sept. 21, 1965

3,207,764
ACTINOSPECTACIN ACYLATES
Herman Hoeksema, Kalamazoo, Mich., assignor to The Upjohn Company, Kalamazoo, Mich., a corporation of Delaware
No Drawing. Filed Jan. 22, 1962, Ser. No. 167,930
8 Claims. (Cl. 260—340.3)

This invention relates to novel compositions of matter and to a process for the preparation thereof, and is particularly directed to the mono-O-acylates of actinospectacin, the mono- and di-O-acylates of dihydroactinospectacin, to intermediates, and to a process producing the same.

Actinospectacin is a biosynthetic product produced by the controlled fermentation of *Streptomyces spectabilis*. Various methods for the production, recovery, and purification of actinospectacin are described in the published literature, e.g., D. J. Mason et al., Antibiotics and Chemotherapy, 11, p. 118, 1961; M. E. Bergy et al., Antibiotics and Chemotherapy, 11, p. 661, 1961, Union of South Africa Patent No. 60/4,098 and Belgian Patent No. 596,175. Actinospectacin is characterized by an optical rotation $[\alpha]_D^{25}=-20°$ ($H_2O$); by solubility in water, methanol, and ethanol, and by insolubility in acetone and hydrocarbon solvents; and by the presence of two basic groups: $pKa_1$ 6.95 ($H_2O$), $pKa_2$ 8.70 ($H_2O$); It was formerly thought that the molecular formula was $C_{14}H_{26}N_2O_7$, but it has since been shown that the formula is $C_{14}H_{24}N_2O_7$.

Dihydroactinospectacin is obtained by the reduction of actinospectacin. Reduction of the carbonyl in the actinospectacin molecule can be accomplished either catalytically or with borohydride. For example, on reacting actinospectacin with sodium borohydride there is obtained dihydroactinospectacin. Also, on hydrogenation of a suspension of actinospectacin dihydrochloride with platinum oxide there is obtained dihydroactinospectacin dihydrochloride.

It has now been found that novel compounds according to this invention are obtained by acylating actinospectacin or dihydroactinospectacin with carbobenzoxy chloride to yield the corresponding carbobenzoxy derivative in which the carbobenzoxy groups are attached to the nitrogen atoms. The N,N'-dicarbobenzoxy derivatives can be acylated to yield N,N'-dicarbobenzoxy mono- and di-O-acylates which upon removal of the dicarbobenzoxy groups yield the corresponding mono- and di-O-acylates. Under these conditions actinospectacin yields mono-O-acylates and dihydroactinospectacin yields mono- and di-O-acylates.

Subsequent to this invention, the structures of actinospectacin and dihydroactinospectacin have been elucidated. The novel compounds of the invention, therefore, can now be represented by the following formula:

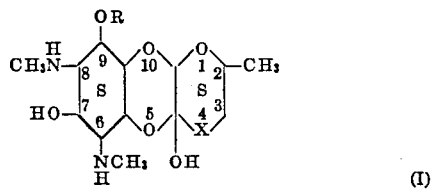

wherein X is selected from the group consisting of $>C=O$,

and

and R is selected from the group consisting of hydrocarbon carboxylic acid acyl of from two to twelve carbon atoms, inclusive; halo-, nitro-, hydroxy-, amino-, cyano-, thiocyano-, and lower alkoxy-substituted hydrocarbon carboxylic acid acyl of from two to twelve carbon atoms, inclusive; and lower alkoxycarbonyl.

The term "hydrocarbon carboxylic acid acyl of from two to twelve carbon atoms" whenever used in the specification or claims is intended to mean an acyl corresponding to a hydrocarbon carboxylic acid of from two to twelve carbon atoms, inclusive. Suitable such acids include (a) a saturated or unsaturated, straight or branched chain aliphatic carboxylic acid, for example, acetic, propionic, butyric, isobutyric, tert-butylacetic, valeric, isovaleric, caproic, caprylic, decanoic, dodecanoic, acrylic, crotonic, hexynoic, heptynoic, octynoic acids, and the like; (b) a saturated or unsaturated alicyclic carboxylic acid, for example, cyclobutanecarboxylic acid, cyclopentanecarboxylic acid, cyclopentenecarboxylic acid, methylcyclopentenecarboxylic acid, cyclohexanecarboxylic acid, dimethylcyclohexenecarboxylic acid, dipropylcyclohexanecarboxylic acid, and the like; (c) a saturated or unsaturated substituted alicyclic aliphatic carboxylic acid, for example, cyclopentaneacetic acid, cyclopentanepropionic acid, cyclopenteneacetic acid, cyclohexanebutyric acid, methylcyclohexaneacetic acid, and the like; (d) an aromatic carboxylic acid, for example, benzoic acid, toluic acid, naphthoic acid, ethylbenzoic acid, isobutylbenzoic acid, methylbutylbenzoic acid, and the like; and (e) an aromatic-aliphatic carboxylic acid, for example, phenylacetic acid, phenylpropionic acid, phenylvaleric acid, cinnamic acid, phenylpropiolic acid, and naphthylacetic acid, and the like.

The term "halogen-, nitro-, hydroxy-, amino-, cyano-, thiocyano-, and lower alkoxy-substituted hydrocarbon carboxylic acid acyl of from two to twelve carbon atoms, inclusive" is intended to mean hydrocarbon carboxylic acid acyl as hereinbefore defined which are substituted by one or more halogen atoms, nitro, hydroxy, amino, cyano, thiocyano, or lower alkoxy groups. By "lower alkoxy" is meant an alkoxy group of from one to six carbon atoms, inclusive, for example, methoxy, ethoxy, propoxy, butoxy, amyloxy, hexyloxy, and isomeric forms thereof. Examples of substituted hydrocarbon carboxylic acid acyl falling within the above definition are the acyl corresponding to chloroacetic acid, chloropropionic acid, bromobutyric acid, iodovaleric acid, chlorocyclohexanecarboxylic acid, o-, m-, and p-chlorobenzoic acid, anisic acid, salicylic acid, p-hydroxybenzoic acid, o-, m-, and p-nitrobenzoic acid, cyanoacetic acid, thiocyanoacetic acid, cyanopropionic acid, lactic acid, glycine, ethoxyformic (ethyl hemicarbonic), and the like.

The intermediate N,N'-dicarbobenzoxy derivatives can be represented by the following formula:

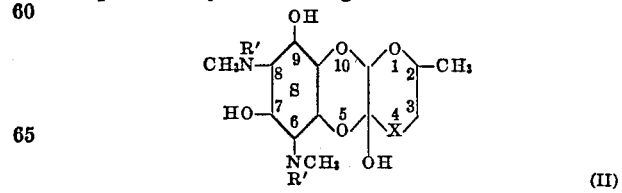

wherein R' is carbobenzoxy and X is selected from the group consisting of $>C=O$ and

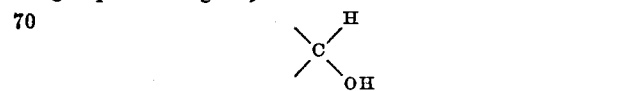

They are obtained by reacting actinospectacin or dihydroactinospectacin with carbobenzoxy chloride.

By protecting the nitrogen with the carbobenzoxy group, the actinospectacin or dihydroactinospectacin molecule can then be readily O-acylated. Actinospectacin yields N,N'-dicarbobenzoxyactinospectacin 9-acylate, and dihydroactinospectacin yields N,N'-dicarbobenzoxy dihydroactinospectacin monoacylate and N,N'-dicarbobenzoxydihydroactinospectacin 4,9-diacylate. For example, when N,N'-dicarbobenzoxyactinospectacin is reacted with acetic anhydride and pyridine there is obtained N,N'-dicarbobenzoxyactinospectacin 9-acetate, and when the same process is applied to dihydroactinospectacin, the corresponding dihydroactinospectacin mono- and 4,9-diacetate are obtained according to the amount of acylating agent used. Catalytic reduction of the acylated compounds yields actinospectacin 9-acylate and dihydroactinospectacin mono- and 4,9-diacylate. For example, on hydrogenolizing N,N'-dicarbobenzoxyactinospectacin 9-acetate and N,N'-dicarbobenzoxydihydroactinospectacin mono- and 4,9-diacetate ethylene glycol dimethyl ether with palladium-on-charcoal catalyst there are obtained actinospectacin 9-acetate, dihydroactinospectacin monoacetate, and dihydroactinospectacin 4,9-diacetate.

Dihydroactinospectacin is obtained upon the reduction of actinospectacin. Reduction of the carbonyl in the actinospectacin molecule can be accomplished either catalytically or with borohydride. For example, on reacting actinospectacin with sodium borohydride there is obtained dihydroactinospectacin. Also, on hydrogenation of a suspension of actinospectacin dihydrochloride with platinum oxide there is obtained dihydroactinospectacin dihydrochloride. The dihydroactinospectacin salt can be converted to the free base by treatment with a strongly basic anion exchange resin. Suitable anion exchange resins for this purpose are obtained by chloromethylating by the procedure given on pages 88 and 97 of Kunin, Ion Exchange Resins, 2nd ed. (1958), John Wiley and Sons, Inc., polystyrene cross-link, if desired, with divinylbenzene prepared by the procedure given on page 84 of Kunin, supra, and quaternizing with trimethylamine, or dimethylalkanolamine by the procedure given on page 97 of Kunin, supra. Anion exchange resins of this type are marketed under the trade-names Dowex 2, Dowex 20, Amberlite IRA-400, Duolite A-102, and Permutit S-1.

Crude dihydroactinospectacin can be upgraded by absorption and elution from a cation exchange resin. Both carboxylic and sulfonic acid types can be used. Suitable carboxylic acid resins include the polyacrylic acid resins obtained by the copolymerization of acrylic acid and divinylbenzene by the procedure given on page 87 of Kunin, Ion Exchange Resins, 2nd ed. (1958), John Wiley and Sons, Inc. Carboxylic acid cation exchange resins of this type are marketed under the trade-names Amberlite IRC-50, and Zeokarb 226. Suitable Sulfonic acid resins include nuclear sulfonated polystyrene resins crosslinked with divinylbenzene obtained by the procedure given on page 84 of Kunin, supra. Sulfonated cation exchange resins of this type are marketed under the trade-names Dowex 50, Amberlite IR-120, Naclite HCR, Chempro C-20, Permutit Q, and Zeokarb 225.

When N,N'-dicarbobenzoxydihydroactinospectacin is acylated with an equimolar amount of an acylating agent N,N'-dicarbobenzoxydihydroactinospectacin monoacylate is obtained. For example, upon reacting N,N'-dicarbobenzoxydihydroactinospectacin with an equimolar amount of acetic anhydride in the presence of pyridine, there is obtained N,N'-dicarbobenzoxydihydroactinospectacin monoacetate. With an equimolar amount of ethyl chloroformate (ethyl chlorocarbonate) in the presence of pyridine there is obtained N,N'-dicarbobenzoxydihydroactinospectacin mono-(ethyl carbonate). On further acylation of the monoacylates, however, there is obtained respectively N,N'-dicarbobenzoxydihydroactinospectacin 4,9-diacetate and N,N'-dicarbobenzoxydihydroactinospectacin 4,9-bis-(ethyl carbonate).

Mixed acylates can be obtained by acylating the N,N'-dicarbobenzoxydihydroactinospectacin monoacylate with a different acylating agent. For example, on reacting N,N'-dicarbobenzoxydihydroactinospectacin monoacetate with sodium propionate and propionic anhydride the corresponding mixed acylate is obtained. A mixed acylate, for example, can similarly be obtained from N,N'-dicarbobenzoxydihydroactinospectacin mono - (ethyl carbonate).

The novel compounds of the invention, actinospectacin 9-acylates, dihydroactinospectacin monoacylates, and dihydroactinospectacin 4,9-diacylates are useful in accordance with U.S. Patents 1,915,334 and 2,075,359 in preparing amine fluosilicate mothproofing agents, and in accordance with U.S. Patents 2,425,320 and 2,606,155, in preparing amine thiocyanate-formaldehyde condensation products for use as pickling inhibitors. They can also be reacted, either as a salt or free base, with formaldehyde and sodium sulfide to form the complex aminomethylsulfide useful as pickling inhibitors.

The following examples are illustrative of the process and products of the present invention but are not to be construed as limiting.

EXAMPLE 1

A. *N,N'-dicarbobenzoxyactinospectacin*

A 50 ml. solution of actinospectacin base in pyridine was concentrated in vacuo to 25 ml. to remove traces of water. A 10 ml. chloroform solution containing 1.7 g. (2 molar equivalents) of carbobenzoxy chloride was slowly added at less than 5° C. This was stored at room temperature over night, then warmed to 50° C. for one hour, evaporated to dryness and finally extracted from a water slurry with ethyl acetate. The solution was dried, partially evaporated and precipitated with Skellysolve B (isomeric hexanes) to yield one gram of product. A portion of this, 750 mg., was distributed in the solvent system cyclohexane, EtOAc, 95% EtOH, H$_2$O, (5:5:6:4) for 200 transfers. N,N'-dicarbobenzoxyactinospectacin was isolated from the main peak fraction (K=0.32).

*Elemental analysis.*—Calculated for C$_{30}$H$_{36}$N$_2$O$_{11}$: C, 59.99; H, 6.04; N, 4.67. Found: C, 59.59; H, 6.24; N, 4.71.

B. *N,N'-dicarbobenzoxyactinospectacin 9-acetate*

Ten grams of crude dicarbobenzoxy derivative prepared according to Example 1A was purified by 25 transfers in a manual Craig unit (50 ml. per phase) using the solvent system described in Example 1A. Five grams of the purified dicarbobenzoxy derivative in 12.5 ml. dry pyridine was reacted with 2.5 ml. acetic anhydride at room temperature. After seven days, 1.2 ml. of water was added and the solution was evaporated to dryness under high vacuum. The residue was dissolved in ethyl acetate, washed several times with water, dried over sodium sulfate, partially evaporated, and then precipitated with Skellysolve B to yield 5.0 g. of N,N'-dicarbobenzoxyactinospectacin 9-acetate. A 1 g. portion of this product was then distributed for 200 transfers in the Craig counter-distribution apparatus using the solvent system 95% ethanol:water:ethyl acetate:cyclohexane (30:20:22:28)

to yield 580 g. of noncrystalline N,N'-dicarbobenzoxyactinospectacin 9-acetate (this was recovered from the major peak, K=0.61).

*Elemental analysis.*—Calculated for C$_{32}$H$_{38}$N$_2$O$_{12}$: C, 59.80; H, 5.96; N, 4.36. Found: C, 59.73; H, 5.90; N, 4.22.

C. *Actinospectacin 9-acetate*

Three grams of N,N'-dicarbobenzoxyactinospectacin 9-actate, prepared as in Example 1B, and 0.3 g. of 30% palladium-on-charcoal catalyst in 100 ml. ethylene glycol dimethyl ether was shaken with hydrogen for 3 hrs. at 40 p.s.i.g. After filtration, the solvent was evaporated in vacuo, and 1.6 g. of residue was obtained. This was reprecipitated from ethyl acetate solution with Skellysolve B to yield actinospectacin 9-acetate.

Elemental analysis.—Calculated for $C_{16}H_{26}N_2O_8$: C, 51.33; H, 7.00; N, 7.48; O, 34.19. Found: C, 51.68; H, 7.09; N, 6.46; O, 34.11.

EXAMPLE 2

By substituting the acetic anhydride in part B of Example 1 by propionic anhydride there is obtained N,N'-dicarbobenzoxyactinospectacin 9-propionate.

On treatment of this compound by the procedure of part C of Example 1 there is obtained actinospectacin 9-propionate.

EXAMPLE 3

By substituting the acetic anhydride and pyridine in part B of Example 1 by acetyl chloride, propionyl chloride, butyryl chloride, valeryl chloride, caproyl chloride, heptanoyl chloride, and caprylyl chloride, and at least a stoichiometric amount of triethylamine, there are obtained the corresponding N,N'-dicarbobenzoxyactinospectacin 9-acetate, N,N'-dicarbobenzoxyactinospectacin 9-propionate, N,N'-dicarbobenzoxyactinospectacin 9-butyrate, N,N'-dicarbobenzoxyactinospectacin 9-valerate, N,N'-dicarbobenzoxyactinospectacin 9-caproate, N,N'-dicarbobenzoxyactinospectacin 9-heptanoate, N,N'-dicarbobenzoxyactinospectacin 9-caprylate.

On treatment of these compounds by the procedure of part C of Example 1, there are obtained actinospectacin 9-acetate, actinospectacin 9-propionate, actinospectacin 9-butyrate, actinospectacin 9-valerate, actinospectacin 9-caproate, actinospectacin 9-heptanoate, and actinospectacin 9-caprylate.

EXAMPLE 4

By substituting the acetic anhydride in part B of Example 1 by methyl, ethyl, propyl, butyl, pentyl, hexyl, heptyl and octyl chloroformate there are obtained the corresponding
N,N'-dicarbobenzoxyactinospectacin 9-(methyl carbonate),
N,N'-dicarbobenzoxyactinospectacin 9-(ethyl carbonate),
N,N'-dicarbobenzoxyactinospectacin 9-(propyl carbonate),
N,N'-dicarbobenzoxyactinospectacin 9-(butyl carbonate),
N,N'-dicarbobenzoxyactinospectacin 9-(pentyl carbonate),
N,N'-dicarbobenzoxyactinospectacin 9-(hexyl carbonate),
N,N'-dicarbobenzoxyactinospectacin 9-(heptyl carbonate), and
N,N'-dicarbobenzoxyactinospectacin 9-(octyl carbonate).

On treatment of these compounds by the procedure of part C of Example 1, there are obtained actinospectacin 9-(methyl carbonate), actinospectacin 9-(ethyl carbonate), actinospectacin 9-(propyl carbonate), actinospectacin 9-(butyl carbonate), actinospectacin 9-(pentyl carbonate), actinospectacin 9-(hexyl carbonate), actinospectacin 9-(heptyl carbonate), and actinospectacin 9-(octyl carbonate).

EXAMPLE 5

Dihydroactinospectacin

A. Catalytic reduction: A suspension of 2.7 g. of actinospectacin dihydrochloride in 100 ml. of 50% ethanol was hydrogenated in the presence of 300 mg. of platform oxide for 3 days at 40 p.s.i.g. hydrogen pressure in a Parr apparatus. Following filtration and evaporation to an aqueous solution, acetone was added and crystallization occurred, yielding 1.45 g. of dihydroactinospectacin dihydrochloride with a melting point of 203–210° C. Recrystallization yielded dihydroactinospectacin dihydrochloride crystals having a melting point 205–208° C. and an optical rotation $[\alpha]_D^{25} = +33°$ (c., 1% in water).

Elemental analysis.—Calculated for $C_{14}H_{26}N_2O_7 \cdot 2HCl$: C, 41.28; H, 6.93; Cl, 17.41. Found: C, 41.78; H, 7.12; Cl, 17.39.

B. N,N' - dicarbobenzoxydihydroactinospectacin: By substituting the actinospectacin in part A of Example 1 by dihydroactinospectacin, there is obtained N,N'-dicarbobenzoxydihydroactinospectacin.

C. N,N'-dicarbobenzoxydihydroactinospectacin monoacetate, and N,N'-dicarbobenzoxydihydroactinospectacin 4,9-diacetate: By substituting N,N'-dicarbobenzoxyactinospectacin in part B of Example 1 by N,N'-dicarbobenzoxydihydroactinospectacin there are obtained N,N'-dicarbobenzoxydihydroactinospectacin monoacetate and N,N'-dicarbobenzoxydihydroactinospectacin 4,9-diacetate.

D. By substituting the N,N'-dicarbobenzoxyactinospectacin and acetic anhydride in part B of Example 1 by N,N'-dicarbobenzoxydihydroactinospectacin and propionic anhydride, there are obtained the corresponding N,N'-dicarbobenzoxydihydroactinospectacin monopropionate and N,N'-dicarbobenzoxydihydroactinospectacin 4,9-dipropionate.

E. By substituting the N,N'-dicarbobenzoxyactinospectacin 9-acetate in part C of Example 1 by N,N'-dicarbobenzoxydihydrospectactin monoacetate and N,N'-dicarbobenzoxydihydroactinospectacin monopropionate there are obtained dihydroactinospectacin monoacetate and dihydroactinospectacin-monopropionate.

F. By substituting the N,N-dicarbobenzoxyactinospectacin 9-acetate in part C of Example 1 by N,N'-dicarbobenzoxydihydroactinospectacin 4,9-diacetate and N,N'-dicarbobenzoxydihydroactinospectacin 4,9-dipropionate there are obtained dihydroactinospectacin 4,9-diacetate and dihydroactinospectacin 4,9-dipropionate.

EXAMPLE 6

By substituting the acetic anhydride in part B of Example 1 by acetyl chloride, propionyl chloride, butyryl chloride, valeryl chloride, caproyl chloride, heptanoyl chloride, and caprylyl chloride, and the pyridine by at least a stoichiomteric amount of triethylamine and N,N'-dicarbobenzoxyactinospectacin by N,N'-dicarbobenzoxydihydroactinospectacin there are obtained the corresponding N,N'-dicarbobenzoxydihydroactinospectacin monoacetate,
N,N'-dicarbobenzoxydihydroactinospectacin monopropionate,
N,N'-dicarbobenzoxydihydroactinospectacin monobutyrate,
N,N'-dicarbobenzoxydihydroactinospectacin monovalerate,
N,N'-dicarbobenzoxydihydroactinospectacin monocaproate,
N,N'-dicarbobenzoxydihydroactinospectacin monoheptanoate,
N,N'-dicarbobenzoxydihydroactinospectacin monocaprylate,
N,N'-dicarbobenzoxydihydroactinospectacin 4,9-diacetate
N,N'-dicarbobenzoxydihydroactinospectacin 4,9-dipropionate,
N,N'-dicarbobenzoxydihydroactinospectacin 4,9-dibutyrate,
N,N'-dicarbobenzoxydihydroactinospectacin 4,9-divalerate,
N,N'-dicarbobenzoxydihydroactinospectacin 4,9-dicaproate,
N,N'-dicarbobenzoxydihydroactinospectacin 4,9-diheptanoate, and
N,N'-dicarbobenzoxydihydroactinospectacin 4,9-dicaprylate.

EXAMPLE 7

By substituting the acetic anhydride in part B of Example 1 by methyl, ethyl, propyl, butyl, pentyl, hexyl, heptyl, and octyl chloroformate and N,N'-dicarbobenzoxyactinospectacin by N,N'-dicarbobenzoxydihydroactinospectacin there are obtained the corresponding N,N'-dicarbobenzoxydihydroactinospectacin mono-(methyl carbonate),
N,N'-dicarbobenzoxydihydroactinospectacin mono-(ethyl carbonate),
N,N'-dicarbobenzoxydihydroactinospectacin mono-propyl carbonate),
N,N'-dicarbobenzoxydihydroactinospectacin mono-(butyl carbonate),
N,N'-dicarbobenzoxydihydroactinospectacin mono-(pentyl carbonate),
N,N'-dicarbobenzoxydihydroactinospectacin mono-(hexyl carbonate),
N,N'-dicarbobenzoxydihydroactinospectacin mono-(heptyl carbonate),
N,N'-dicarbobenzoxydihydroactinospectacin mono-(octyl carbonate),
N,N'-dicarbobenzoxydihydroactinospectacin 4,9-bis-(methyl carbonate),
N,N'-dicarbobenzoxydihydroactinospectacin 4,9-bis-(ethyl carbonate),
N,N'-dicarbobenzoxydihydroactinospectacin 4,9-bis-(propyl carbonate),
N,N'-dicarbobenzoxydihydroactinospectacin 4,9-bis (butyl carbonate),
N,N'-dicarbobenzoxydihydroactinospectacin 4,9-bis-(pentyl carbonate),
N,N'-dicarbobenzoxydihydroactinospectacin 4,9-bis-(hexyl carbonate),
N,N'-dicarbobenzoxydihydroactinospectacin 4,9-bis-(heptyl carbonate), and
N,N'-dicarbobenzoxydihydroactinospectacin 4,9-bis-(octyl carbonate).

I claim:
1. A compound of the formula

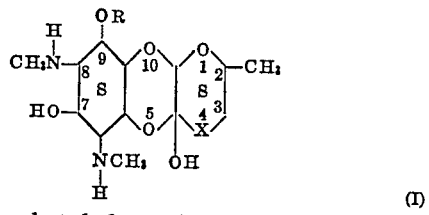

(I)

wherein X is selected from the group consisting of >C=O,

and

and R is selected from the group consisting of hydrocarbon carboxylic acid acyl of from two to twelve carbon atoms, inclusive; halo-, nitro-, hydroxy-, amino-, cyano-, thiocyano-, and lower alkoxy-hydrocarbon carboxylic acid acyl of from two to twelve carbon atoms, inclusive; and lower alkoxycarbonyl.

2. Actinospectacin 9-lower alkanoate of Formula I wherein R is lower alkanoyl and X is >C=O.

3. Actinospectacin 9-acetate of Formula I wherein R is acetyl and X is >C=O.

4. A compound of the formula:

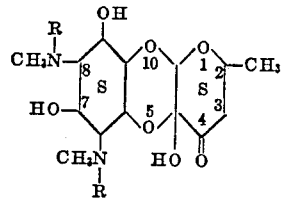

wherein R is carbobenzoxy.

5. A compound of the formula:

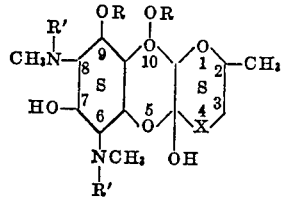

(II)

wherein R' is carbobenzoxy and X is

and R is selected from the group consisting of hydrocarbon carboxylic acid acyl of from two to twelve carbon atoms, inclusive; halo-, nitro-, hydroxy-, amino-, cyano-, thiocyano-, and lower alkoxy-hydrocarbon carboxylic acid acyl of from two to twelve carbon atoms, inclusive; and lower alkoxy-carbonyl.

6. N,N'-dicarbobenzoxyactinospectacin 9-lower alkanoate of Formula II wherein R is lower alkanoyl, and X is >C=O.

7. N,N' - dicarbobenzoxyactinospectacin 9 - acetate of Formula II wherein R is acetyl, and X is >C=O.

8. A compound of the formula:

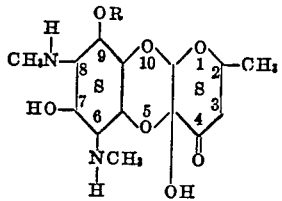

(I)

wherein R is selected from the group consisting of hydrocarbon carboxylic acid acyl of from 2 to 12 carbon atoms, inclusive; halo-, nitro-, hydroxy-, amino-, cyano, thiocyano-, and lower alkoxy-hydrocarbon carboxylic acid acyl of from 2 to 12 carbon atoms, inclusive; and lower alkoxy carbonyl.

References Cited by the Examiner
UNITED STATES PATENTS
2,336,093  12/43  Grün et al. _____ 260—340.3
2,997,471  8/61  Cheney et al. _____ 260—559

NICHOLAS S. RIZZO, *Primary Examiner.*
DUVAL T. McCUTCHEN, *Examiner.*

UNITED STATES PATENT OFFICE
CERTIFICATE OF CORRECTION

Patent No. 3,207,764                      September 21, 1964

Herman Hoeksema

It is hereby certified that error appears in the above numbered patent requiring correction and that the said Letters Patent should read as corrected below.

Column 3, line 55, for "Sulfonic" read -- sulfonic --; line 60, for "Naclite" read -- Nalcite --; column 5, line 69, for "platform" read -- platinum --; column 6, line 26, for "benzoxydihydrospectactin" read -- benzoxydihydrospectacin --; column 7, line 9, for "propyl" read -- (propyl --; column 8, lines 15 to 22, the formula should appear as shown below instead of as in the patent:

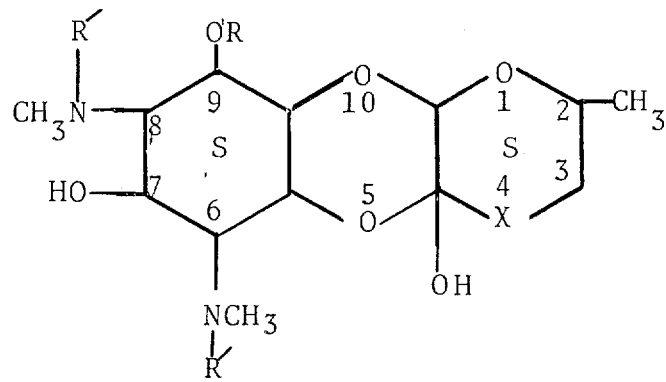

Signed and sealed this 5th day of July 1966.

(SEAL)
Attest:

ERNEST W. SWIDER                            EDWARD J. BRENNER
Attesting Officer                       Commissioner of Patents